July 21, 1964 W. B. SEIDEL ETAL 3,141,268
GRINDING MACHINE SPINDLE
Filed April 25, 1963
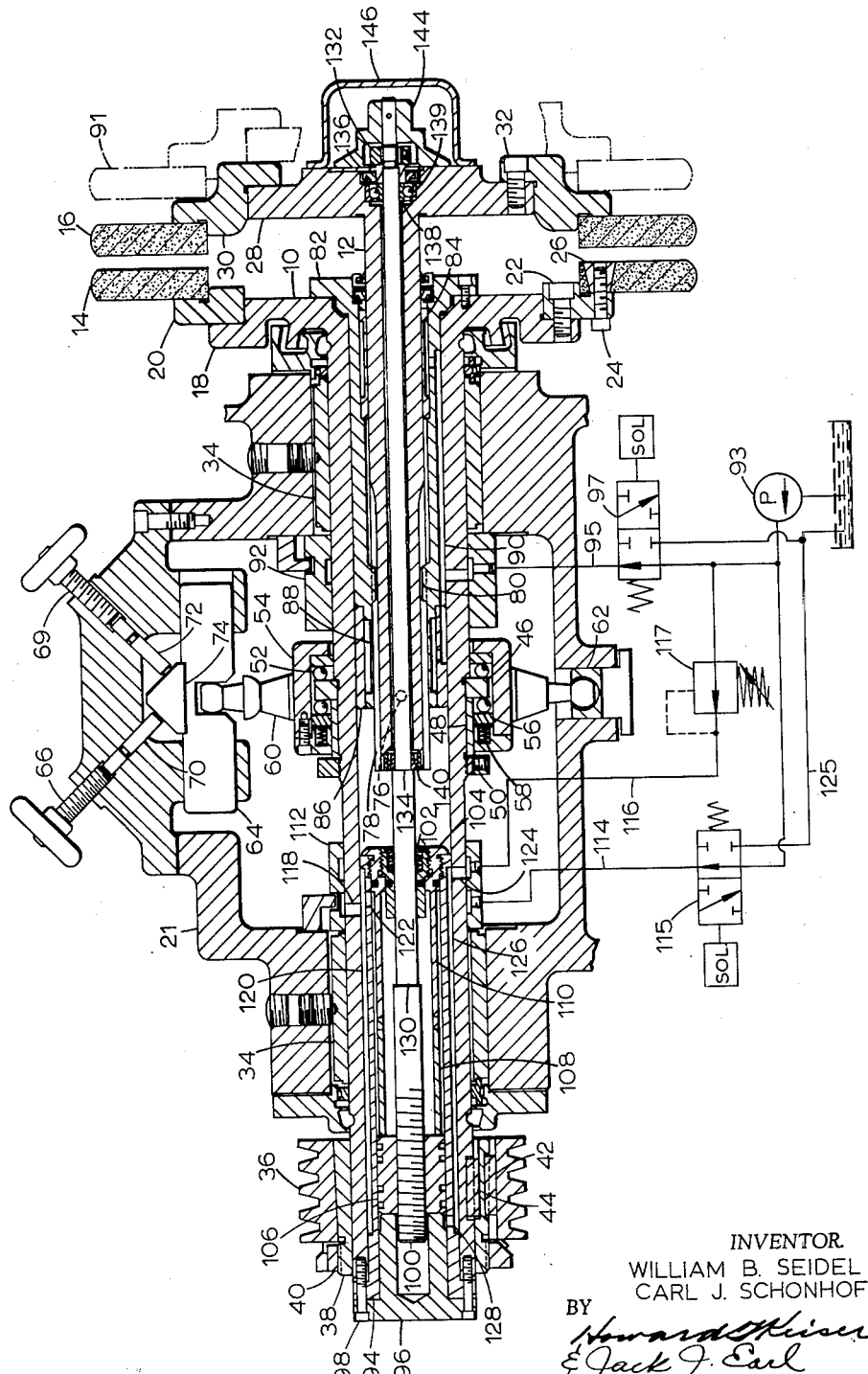
INVENTOR.
WILLIAM B. SEIDEL
CARL J. SCHONHOFT
BY
*Howard T. Keiser*
*& Jack J. Earl*
ATTORNEYS

United States Patent Office 3,141,268
Patented July 21, 1964

3,141,268
GRINDING MACHINE SPINDLE
William B. Seidel and Carl J. Schonhoft, Cincinnati, Ohio, assignors to The Cincinnati Milling Machine Co., Cincinnati, Ohio, a corporation of Ohio
Filed Apr. 25, 1963, Ser. No. 275,697
11 Claims. (Cl. 51—168)

This invention relates to precision grinding machines and more particularly to a spindle mechanism on which two spaced apart grinding wheels are rotatable in unison and are relatively axially adjustable while they are rotating.

In many grinding operations a plurality of grinding wheels are mounted on a single spindle and used to perform simultaneous operations on a workpiece. The truing of these wheels sometimes presents a problem, particularly when a contour must be maintained on the periphery of the wheels and there is not adequate space between the wheels to allow a truing mechanism to form the contour without interference from another wheel. For example, a grinding machine adapted to simultaneously grind two spaced ball tracks on a single inner race member will have two wheels each with an arcuate periphery. In order to true these wheels, the truing mechanism must necessarily extend part way into the space between the wheels to complete the arcuate form on each wheel. If the wheels are closely spaced, the truing operation becomes difficult to perform, especially with truing devices of the type using a single point diamond dresser such as shown in U.S. Patent 2,665,681 issued January 12, 1954 on an application by Frederick S. Haas and Winthrop Trible.

It is therefore an object of this invention to provide a spindle mechanism which will allow a pair of grinding wheels to be moved selectively apart and together while rotating to facilitate contour truing operations on the wheels.

It is also an object of this invention to provide a spindle construction which affords the separation of a pair of grinding wheels thereon by a predetermined amount.

It is a further object of this invention to provide a grinder spindle construction in which the grinding wheels are mounted on telescoping spindle members that are held in a concentric relation but are movable relative to one another in the axial direction to alter the grinding wheel spacing.

Other objects and advantages of the present invention should be readily apparent by reference to the following specification, considered in conjunction with the accompanying drawings forming a part thereof, and it is to be understod that any modifications may be made in the exact structural details there shown and described, within the scope of the appended claims, without departing from or exceeding the spirit of the invention.

In its preferred form this invention utilizes a spindle mechanism which includes two spindle members that are relatively movable in the axial direction, one of the members being received in and extending from one end of the other member. A grinding wheel is mounted on each of the spindle members in a spaced apart relation. A piston and cylinder motor is included between the spindle members and is operable to move one of the members relative to the other to move the wheels from a relatively closely spaced condition to a relatively widely spaced condition and to return the wheels to the closely spaced condition. The stroke of the motor is adjustable to alter the spacing conditions of the wheels. A mechanism is also included in the outer spindle member to grip the inner spindle member such that the two are held concentric with one another while they are rotated in unison.

A clear understanding of the spindle mechanism of this invention can be obtained from the following detailed description in which reference will be made to the attached drawing, FIG. 1, which is a longitudinal section of a grinding machine spindle with a schematically shown hydraulic circuit connected to operate the mechanism.

The mechanism shown in FIG. 1 includes two telescoping spindles 10, 12 which are rotatable in unison and each of which is adapted to hold a grinding wheel 14, 16, respectively. The outer spindle 10 includes a flange 18 at one end to which a collet 20 is attached by machine screws 22. The grinding wheel 14 is received on the collet 20 and is held thereon by machine screws 24 that are threaded into tapered plugs 26 spaced around the wheel 14. A flange 28 is also formed on one end of the inner spindle 12 and a collet 30 is fixed to it by screws 32. The grinding wheel 16 is attached to the collet 30 in the same manner that the wheel 14 is attached to the collet 20.

The outer spindle 10 is rotatably received through a wheelhead 21 in two bearings, each bearing being comprised of a set of rocking shoe members 34 spaced around the spindle 10 and separated from the spindle 10 by a thin wedge of oil which is maintained therebetween. A bearing of this type is shown and described in U.S. Patent 2,160,778 issued May 30, 1939 on an application filed by Albert H. Dall and Hans Ernst. The spindle 10 is furnished its rotating drive through a sheave 36 received over the end of the spindle 10 opposite the grinding wheel 14. The sheave 36 is held on a tapered sleeve 38 by a nut 40 and is rendered rotatably fixed thereon by a key 42. The sleeve 38 is tightly received on the spindle 10 and made to rotate therewith by a key 44. A thrust flange 46 is attached to the spindle 10 between the spaced sets of rocking shoe bearings 34 by means of a spacer 48 and nut 50. A thrust bearing mechanism is received over the flange 46 and is comprised of a set of balls 52 on each side of the flange in a housing 54 loosely received over the spindle 10. A floating ring 56 is received in the housing 54 and is biased to move toward the flange 46 by a set of springs 58 thereby clamping the flange 46 between the sets of balls 52. The thrust bearing housing 54 is held in the wheelhead 21 by a pivotally adjustable yoke 60 whose lower end is received in a ball socket 62 in the wheelhead 21. The upper end of the yoke 60 is embraced by a slidable member 64 the position of which is adjustable by selected turning of the screws 66, 69 that hold a pair of plungers 70, 72 in contact with opposite angular sides of a member 74 fixed to the slidable member 64. The yoke 60 is pivotally attached by a pin 76 at the side of the bearing housing 54. Thus the spindle 10 is rotatable in the wheelhead 21 and can be axially adjusted therein a limited amount.

As shown, the spindle 10 has an opening through it into which the inner spindle 12 is inserted. A portion of the spindle 12 has splines 78 formed thereon mating with short internal splines 80 formed in a bushing 82 which is fixed in the outer spindle 10 to form a part thereof. Thus the outer and inner spindles 10, 12 rotate together. In order that the outer and inner spindles 10, 12 are concentric and do not chatter together, a sleeve 84 having a thin walled center section extending therearound is inserted between the bushing 82 and spindle 12 at one end and a sleeve extension 88 having a similar thin walled section is formed on the rear end of the bushing 82 and backed up by a spacer 86. An oil groove 90 is formed along the bushing 82 and spacer 86 and it is in communication with the space behind the thin walled sleeves 84, 88. A fluid commutator ring 92 is received around the spindle 10 in the wheelhead 21 and fluid under pressure is furnished therefrom through the spindle 10 to the groove 90. The fluid under pressure in the ring 92 is supplied from a pump 93 and pressure line 95 by way of the solenoid operated valve 97. This fluid under pressure tends to bulge the sleeves 84, 88 radially inwardly to grip the inner spindle 12 and holds the two spindles 10, 12 concentric without chatter therebetween.

The inner spindle 12 is movable axially in and out of the spindle 10 to alter the spacing between the grinding wheels 14, 16, this being accomplished by moving the wheel 16 from its closely spaced position shown to and from the more remote position 91 indicated. The mechanism by which this movement is made is included in the spindle 10 behind the other spindle 12. A cylinder liner 94 is inserted into the rear of the spindle 10 and closed by a cap member 96 which, with the liner 94, is fixed to the spindle 10 by cap screws 98. The other end of the liner 94 is closed around a piston rod 100 by a pair of stop members 102, 104 threaded together to form a dual purpose stop which in turn is threadedly fixed in the liner 94. A piston 106 is threaded onto the piston rod 100 and is slidable in the liner 94 to shift the rod 100. A set of spaced and elongated fingers 108 extends from one side of the piston 100 toward the stop member 104 which also has a set of spaced fingers 110 extending toward the piston 106. These fingers 108, 110 mate in a sliding interdigitating manner and since the stop member 104 is fixed relative to the spindle 10, the piston 106 does not rotate relative to the spindle 10 but moves only axially therein.

To supply the fluid under pressure to the motor, a second fluid commutator ring 112 is received around the spindle 10 and has two connections to fluid under pressure. One connection 114 is supplied with high pressure fluid the supply of which can be interrupted by selected operation of a solenoid valve 115 while the other connection 116 is furnished constantly with reduced pressure fluid from a pressure reducing valve 117. The high pressure fluid connection 114 communicates with the right side of the piston 106 through a port 118 in the spindle 10 and a groove 120 and port 122 in the liner 94. The other reduced pressure fluid connection communicates with the left side of the piston 106 through a port 124 in the spindle and a groove 126 and port 128 in the liner 94. It is pointed out that both the grooves 120 and 126 are of the same dimension to balance the mechanism since the groove 120 would not be required otherwise along the liner 94 to connect the pressurized fluid to the right side of the piston 106 from the commutator ring 112. With fluid under the respective pressures connected to the commutator ring 112, the force produced on the right side of the piston 106 will be several times greater than that on the left side and the piston 106 will be held against the cap member 96. When the high pressure connection 114 is opened to the low pressure of a return line 125 by operation of the valve 115, the force on the left side of the piston 106 will move the piston rod 100 and piston 106 rightward until a shoulder 130 on the rod 100 engages the stop member 102. The piston rod 100 extends through the inner spindle 12 and is connected to that spindle by a nut 132 which is turned on the rod 100 to hold the spindle 12 firmly between the nut 132 and a shoulder 134 on the rod 100. To prevent wear on the thin walled sections 84 and 88 during axial movement of the spindle 12, the valve 97 is operated to remove the fluid pressure from behind those sections by connecting the fluid line 95 to the return line 125. This is done by energizing the solenoid of the valve 97 for a brief period each time that the valve 115 is shifted either to extend or to retract the spindle 12 so that the spindle 12 is free to move in either direction without any drag at the thin walled sections 84, 88. Thus, the spindle 12 is freely moved axially with the rod 100 as fluid under the described pressures is connected to one or both sides of the piston 106.

As shown, the nut 132 bears against a bushing 136 which in turn bears against an inner bearing race 138 whose outer race 139 is received in the spindle 12. The shoulder 134 also bears against a bearing 140 received in the spindle 12 at its other end. Thus the rod 100 and the spindle 12 are relatively rotatable although axially fixed together. When the spindles 10, 12 are stopped, the rod 100 may be rotated by means of a dial knob 144 fixed to its outer end under a removable cover 146 to shift the rod 100 relative to the piston 106 since the piston 106 is held in a non-rotating condition by the mating fingers 108, 110. This shift will alter the spacing between the stop shoulder 130 and the stop member 102 and will thereby alter the stroke of the piston 106 and rod 100. A corresponding alteration of the initial separation of the wheels 14, 16 will also occur with a change in the spacing of the piston 106 and shoulder 130.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. A precision grinding machine spindle mechanism comprising in combination:
   (a) a first rotatable spindle,
   (b) a second spindle slidably received in said first spindle for movement therein between predetermined axially spaced positions and rotatable therewith, one end of said second spindle extending from said first spindle at one end thereof,
   (c) a first and second collet fixed respectively on said one end of said first and second spindles, each collet adapted to hold a grinding wheel thereon, and
   (d) means to shift said second spindle one way and the other in said first spindle between the predetermined axially spaced positions thereof to alter the relative spacing of said collets.

2. The mechanism of claim 1 wherein said last recited means is a piston and cylinder motor received in said first spindle and connected to said second spindle for axial movement thereof between the predetermined axially spaced positions thereof relative to said first spindle.

3. The mechanism of claim 2 wherein said piston and cylinder motor includes:
   (a) a cylinder in said first spindle,
   (b) a piston slidably received in said cylinder, and
   (c) a piston rod connected between said piston and said second spindle.

4. The mechanism of claim 1 wherein means are included in said first spindle to hold said second spindle concentric within said first spindle for rotation of said spindles on a common axis.

5. The mechanism of claim 4 wherein said means holding said spindles concentric includes:
   (a) a thin walled sleeve received in said first spindle around said second spindle and
   (b) means to supply fluid under pressure between said first spindle and sleeve tending to bulge said sleeve inwardly and uniformly therearound to hold said second spindle centrally through said first spindle.

6. A precision grinding machine spindle mechanism comprising in combination:
   (a) a first rotatable spindle,
   (b) a second spindle slidably received in said first spindle for movement therein between axially spaced positions, one end of said second spindle extending from said first spindle at one end thereof,
   (c) a first and a second collet respectively fixed on said one end of said first and second spindles, each of said collets adapted to hold a grinding wheel thereon,
   (d) means to rotate said second spindle with said first spindle regardless of the relative axial position of said second spindle in said first spindle,
   (e) means to adjust the amount of relative axial movement of said second spindle in said first spindle, and
   (f) means to shift said second spindle one way and the other in said first spindle between the axially spaced positions thereof to shift said collets between positions of close spacing and remote spacing.

7. The mechanism of claim 6 wherein:
 (a) said second spindle has axially extending splines along a portion of the outer surface thereof and
 (b) said means to rotate said second spindle with said first spindle is a set of splines extending inwardly from said first spindle and mating with said second spindle splines.

8. A precision grinding machine spindle mechanism comprising in combination:
 (a) a first rotatable spindle,
 (b) a second spindle slidably received in said first spindle for movement therein between axially spaced positions, one end of said second spindle extending from said first spindle at one end thereof,
 (c) a first and a second collet fixed respectively on said one end of said first and second spindles, each of said collets adapted to hold a grinding wheel thereon,
 (d) means to rotate said second spindle with said first spindle regardless of the axial position of said second spindle in said first spindle,
 (e) a cylinder in said first spindle,
 (f) a piston slidably received in said cylinder,
 (g) a piston rod threadedly engaged through said piston and connected to said second spindle,
 (h) means selectively to rotate said rod relative to said piston to alter the position of said piston thereon,
 (i) means to relatively establish the axially spaced positions of said second spindle in accordance with the position of said piston on said rod, and
 (j) means to connect a fluid pressure differential to said cylinder across said piston to shift said second spindle from one axially spaced position to another to relatively shift said collets.

9. The mechanism of claim 8 wherein:
 (a) said means to establish the axially spaced positions of said second spindle includes
  (1) a pair of stops each fixed in one end of said cylinder, and
  (2) a shoulder on said rod on one side of said piston adapted to engage one of said stops when the piston is moved in one direction, and
 (b) said piston is adapted to engage the other of said stops when the piston is moved in the other direction.

10. The mechanism of claim 9 wherein:
 (a) one of said stops includes a plurality of elongated fingers extending therefrom axially along said cylinder and spaced around said rod, and
 (b) said piston includes a plurality of elongated fingers extending therefrom toward said one stop and spaced around said rod, said stop and piston fingers slidably mating in an interdigitating manner to prevent said piston from rotating in said cylinder relative to said spindles.

11. The mechanism of claim 8 wherein:
 (a) said piston rod extends axially through said second spindle to said one end thereof and is rotatable relative thereto,
 (b) means are provided to prevent said piston from rotating relative to said spindles, and
 (c) said means to rotate the piston rod is a dual knob fixed to said rod at said one end of said second spindle.

References Cited in the file of this patent

UNITED STATES PATENTS

| | | |
|---|---|---|
| 1,955,129 | Howe | Apr. 17, 1934 |
| 2,195,054 | Wallace et al. | Mar. 26, 1940 |
| 2,301,055 | Lalime | Nov. 3, 1942 |
| 2,665,681 | Hass | Jan. 12, 1954 |
| 3,093,128 | Seidel | June 11, 1963 |

FOREIGN PATENTS

| | | |
|---|---|---|
| 398,519 | Great Britain | Sept. 5, 1933 |